United States Patent
Munzinger et al.

(10) Patent No.: US 11,326,081 B2
(45) Date of Patent: May 10, 2022

(54) METHOD FOR CONNECTING MOLDED BODIES BY INJECTING A SINGLE-COMPONENT HEAT-CURING EPOXY RESIN COMPOSITION INTO CAVITIES

(71) Applicant: SIKA TECHNOLOGY AG, Baar (CH)

(72) Inventors: Noah Munzinger, Zürich (CH); Antonio Voci, Zürich (CH); Urs Rheinegger, Regensdorf (CH)

(73) Assignee: SIKA TECHNOLOGY AG, Baar (CH)

( * ) Notice: Subject to any disclaimer, the term of this patent is extended or adjusted under 35 U.S.C. 154(b) by 197 days.

(21) Appl. No.: 16/614,714

(22) PCT Filed: Jun. 22, 2018

(86) PCT No.: PCT/EP2018/066735
§ 371 (c)(1),
(2) Date: Nov. 18, 2019

(87) PCT Pub. No.: WO2018/234534
PCT Pub. Date: Dec. 27, 2018

(65) Prior Publication Data
US 2020/0181464 A1 Jun. 11, 2020

(30) Foreign Application Priority Data

Jun. 22, 2017 (EP) .................................. 17177416

(51) Int. Cl.
*C09J 163/00* (2006.01)
*C09J 5/06* (2006.01)
*C09J 11/08* (2006.01)

(52) U.S. Cl.
CPC ............... *C09J 163/00* (2013.01); *C09J 5/06* (2013.01); *C09J 11/08* (2013.01); *C09J 2463/00* (2013.01); *C09J 2467/00* (2013.01)

(58) Field of Classification Search
CPC ...................................................... C09J 163/00
See application file for complete search history.

(56) References Cited

FOREIGN PATENT DOCUMENTS

| EP | 1 359 202 A1 | 11/2003 | |
|---|---|---|---|
| EP | 1359202 A1 * | 11/2003 | ............. C08G 18/10 |

(Continued)

OTHER PUBLICATIONS

Jul. 30, 2018 International Search Report issued in International Patent Application No. PCT/EP2018/066735.

*Primary Examiner* — Daniel H Lee
(74) *Attorney, Agent, or Firm* — Oliff PLC

(57) ABSTRACT

A method of bonding two shaped bodies S1 and S2 including the steps of: a) providing shaped body S1; b) arranging shaped body S2 wherein shaped body S1, forming cavity between two shaped bodies, c) introducing one-component thermosetting epoxy resin compositions into cavity, wherein one-component thermosetting epoxy resin composition is one-component thermosetting epoxy resin composition including: at least one epoxy resin A having average of more than one epoxy group per molecule; at least one curing agent B for epoxy resins activated by elevated temperature; at least one polyester polyol PP obtainable by reaction of at least one diol having structure HO—$(CH_2)_{x'}$—OH the value of $x'=2-10$, and —at least one dicarboxylic acid having structure HOOC—$(CH_2)_{y'}$—COOH and derivatives of dicarboxylic acid, value of $y'=8-18$, and wherein proportion of polyester polyol PP is 1.5% to 20% by weight, based on total weight of one-component thermosetting epoxy resin composition.

16 Claims, 7 Drawing Sheets

(56) References Cited

FOREIGN PATENT DOCUMENTS

Figure 1A:
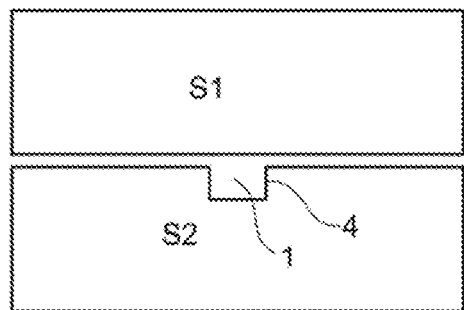

WO 2016/081376 A1 5/2016
WO WO-2016081376 A1 * 5/2016 .............. C09J 11/08

* cited by examiner

METHOD FOR CONNECTING MOLDED BODIES BY INJECTING A SINGLE-COMPONENT HEAT-CURING EPOXY RESIN COMPOSITION INTO CAVITIES

TECHNICAL FIELD

The invention relates to a method of bonding, especially structural bonding, of two shaped bodies, especially bodywork elements for motor vehicles, and to the use of one-component thermosetting epoxy resin compositions in such methods.

STATE OF THE ART

One-component thermosetting epoxy resin compositions are frequently used for bonding of metal substrates such as steel sheets when high strengths are required, for example in automobile construction.

In the composite formed from such shaped bodies, these are adhesive-bonded to one another for bonding. This is typically done using adhesives that are applied as adhesive beads to a first shaped body, and then a second shaped body to be bonded is applied to this adhesive bead for bonding of the two shaped bodies.

A further method of bonding shaped bodies such as metal sheets, cast parts and extrusion profiles envisages injecting a liquid adhesive into a closed cavity in order thus to bond the shaped bodies to be bonded to one another. A disadvantage of this method is that it is necessary to create cavities sealed in a fluid-tight manner, which define a space for the liquid adhesive. This can be achieved with seals, for example, or requires elements having very small manufacturing tolerances. The consequence is that such systems are complex and costly to manufacture.

DESCRIPTION OF THE INVENTION

It is therefore an object of the present invention to provide an improved process for bonding, especially structural bonding, of to shaped bodies, which permits less expensive bonding, in a more easily manageable manner, of shaped bodies, for example bodywork elements in motor vehicles.

This object is surprisingly achieved by a method as claimed in claim 1.

The method of the invention has the advantage that bonding of two shaped bodies does not require provision of a space sealed fluid-tight for the adhesive; instead, it is possible to use a less expensive open system which is easier to handle and without interspaces sealed fluid-tight. It is thus possible to use, for example, bodywork elements that do not have seals, which is a considerable cost advantage. Moreover, the present invention also permits (adhesive) bonding of shaped bodies with greater manufacturing tolerances because there is no need to provide any spaces sealed fluid-tight for the adhesive. This is also a significant cost advantage over the known systems because this allows the various elements of the system to be manufactured at lower cost and with greater manufacturing tolerances. Moreover, an operation of bonding of the shaped bodies is easier to accomplish since filling of closed spaces with adhesive entails difficulties that can be avoided in this way, especially the displacing of the air in the closed cavity by the adhesive.

Further aspects of the invention are the subject of the further independent claims; preferred executions of the invention are the subject of the dependent claims.

WAYS OF EXECUTING THE INVENTION

The present invention thus relates to a method of bonding, especially structural bonding, of two shaped bodies S1 and S2, said method comprising the steps of:
a) providing a shaped body S1;
b) arranging a shaped body S2 with respect to the shaped body S1, forming a cavity (1) between the two shaped bodies S1 and S2,
c) introducing a one-component thermosetting epoxy resin compositions into the cavity (1),
wherein the one-component thermosetting epoxy resin composition is a one-component thermosetting epoxy resin composition comprising
at least one epoxy resin A having an average of more than one epoxy group per molecule;
at least one curing agent B for epoxy resins which is activated by elevated temperature;
at least one polyester polyol PP obtainable by the reaction of
at least one diol having the structure HO—(CH$_2$)$_{x'}$—OH where the value of x'=2 to 10, and
at least one dicarboxylic acid having the structure HOOC—(CH$_2$)$_{y'}$—COOH and derivatives of this dicarboxylic acid, where the value of y'=8 to 18.

The proportion of the polyester polyol PP is 1.5% to 20% by weight, based on the total weight of the one-component thermosetting epoxy resin composition.

FIG. 1a shows a cross section of two shaped bodies S1 and S2 arranged with respect to one another after step b), having a cavity (1) between one another.

The cavity (1) is preferably an open cavity. The term "open" or "open cavity" in this document means "liquid-permeable" or "unsealed".

It is further advantageous when there is essentially no change in the distance in the cavity (1) between the two shaped bodies after the step b) of arranging a shaped body S2 with respect to the shaped body S1. The term "essentially" is preferably understood to mean a change in the distance of less than 30%, less than 20%, especially less than 10%.

It may further be advantageous when there is essentially no change in the distance between the two shaped bodies, 0-100 mm, especially 0-30 mm, alongside the cavity (1), after the step b) of arranging a shaped body S2 with respect to the shaped body S1. The word "essentially" here is preferably understood to mean a change in the distance of less than 30%, less than 20%, especially less than 10%.

It may further be advantageous when the distance between the two shaped bodies of 0-100 mm, especially 0-30 mm, alongside the cavity (1) after step b) is 0.5-15 mm, especially 0.5-10 mm, preferably 0.5-5 mm, more preferably 1-3 mm.

Figure 1B:
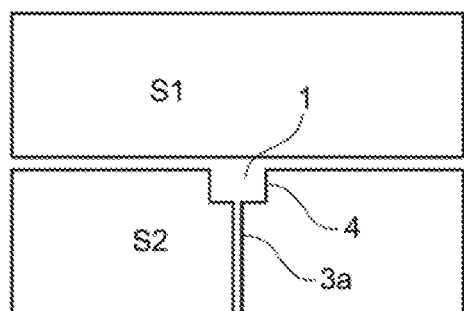

It may be further preferable when the one-component thermosetting epoxy resin composition is introduced through at least one introduction opening (2) in at least one of the two shaped bodies. Such an introduction opening (2) can be seen, for example, in FIG. 1b in the shaped body S2. Preferably, the introduction opening (2) is disposed on the side of the shaped body remote from the other shaped body.

Moreover, the at least one introduction opening (2) is preferably directly connected to the cavity (1) via an introduction channel (3a).

Figures 1C, 1D:
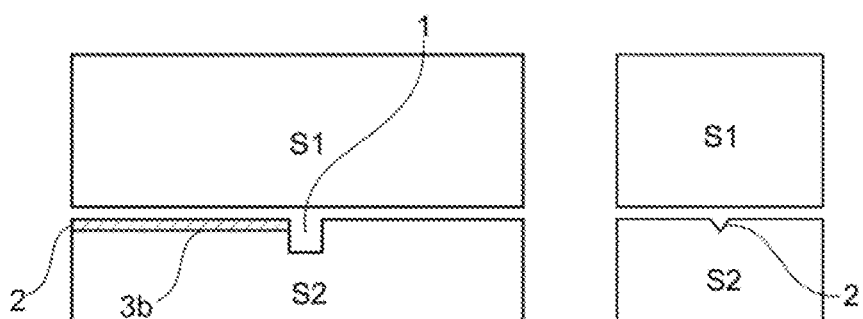

However, it may be advantageous when, as shown in cross section of FIG. 1c, the one-component thermosetting epoxy resin composition is introduced into the cavity (1) through an introduction channel (3b), the introduction channel (3b) being disposed on the surface of at least one of the two shaped bodies that faces the other shaped body. FIG. 1d shows a side view of the two moldings arranged relative to one another.

The cavity (1) is preferably a bonding site for the composite of the two shaped bodies, especially an intended structural bonding site. This is therefore preferably configured so as to be able to accommodate a sufficient amount of epoxy resin composition for a structural bond between the two shaped bodies to be assured. For this purpose, in particular, a suitable thickness of the epoxy resin composition introduced and a suitable contact area of the epoxy resin composition introduced with the shaped body S1, or shaped body S2, are advantageous.

Preferably, the cavity (1) is a material recess (4) in at least one of the two shaped bodies.

The shaped bodies S1 and S2 may be made of the same material or a different material. The shaped bodies are preferably made of metal or other heat-resistant materials, especially metal or heat-resistant plastics, for example polyamides (PA), polyphenylene ethers, e.g. Noryl®, or heat-resistant fiber-reinforced plastics such as carbon fiber-reinforced plastics (CFRP) or glass fiber-reinforced plastics (GFRP). Examples of suitable metals are especially steel, especially electrolytically galvanized steel, hot-dip galvanized steel or oiled steel, Bonazinc-coated steel, and subsequently phosphated steel, and aluminum.

Suitable shaped bodies S1 and S2 are especially shaped bodies as utilized, for example, in the construction of modes of transport, for example in the automobile industry, or in the manufacture of white goods.

It has been found that, surprisingly, the use of a one-component thermosetting epoxy resin composition as claimed in claim 1 can provide a self-sealing system. It has been found that, surprisingly, using such an epoxy resin composition that, on cooling, has a sharp transition between an unsolidified state and a solidified state, it is possible to join open systems without the use of sealing elements, for example.

In step b) of arranging the shaped body S2 with respect to the shaped body S1, a cavity (1) is formed between the two shaped bodies S1 and S2.

The two shaped bodies may be arranged with respect to one another here, for example, in such a way that the two shaped bodies are in direct contact at at least one point or they may be arranged spaced apart from one another. Preferably, in step b), the two shaped bodies S1 and S2 are prefixed by mechanical joining methodology on one or two sides, especially by rivets, welds, screws or bolts, optionally with the use of spacers. This joining methodology is especially intended to ensure that the two shaped bodies S1 and S2 arranged with respect to one another remain in the intended position before the introduced epoxy resin composition has solidified and/or hardened.

The epoxy resin composition has one component, meaning that the constituents of the epoxy resin composition, especially at least one epoxy resin A, the at least one hardener B and the at least one polyester polyol PP, are present in one component without occurrence of curing at standard ambient temperature or room temperature. Therefore, the one-component epoxy resin composition is storage-stable. It is therefore salable in this form, whereas, in the case of two-component systems, the mixing of the components is possible only immediately before application.

In this document, the use of the term "independently" in connection with substituents, radicals or groups should be interpreted such that the substituents, radicals or groups having the same designation in the same molecule may occur simultaneously with different meanings.

In this document, a "toughness improver" is understood to mean an addition to an epoxy resin matrix that results in a distinct increase in toughness even in the case of small additions of ≥5% by weight, especially ≥10% by weight, based on the total weight of the epoxy resin compositions and is thus capable of absorbing higher flexural, tensile, impact or shock stress before the matrix cracks or breaks.

The prefix "poly" in substance names such as "polyol", "polyisocyanate", "polyether" or "polyamine" in the present document indicates that the respective substance, in a formal sense, contains more than one of the functional groups that occur in its name per molecule.

In the present document, "molecular weight" is understood to mean the molar mass (in grams per mole) of a molecule. "Average molecular weight" is understood to mean the number-average molecular weight $M_n$ of an oligomeric or polymeric mixture of molecules, which is typically determined by means of GPC against polystyrene as standard.

A "primary hydroxyl group" refers to an OH group bonded to a carbon atom having two hydrogens.

In the present document, the term "primary amino group" refers to an $NH_2$ group bonded to one organic radical, while the term "secondary amino group" refers to an NH group bonded to two organic radicals which may also together be part of a ring. Accordingly, an amine having one primary amino group is referred to as "primary amine", one having a secondary amino group correspondingly as "secondary amine", and one having a tertiary amino group as "tertiary amine".

In the present document, "room temperature" refers to a temperature of 23° C.

The term "structurally" in relation to the nature of the bonding between shaped bodies is understood in the present document to mean, in particular, a bond using a cured epoxy resin composition having mechanical properties, as referred to hereinafter as preferred mechanical properties, especially in relation to tensile strength, elongation at break and modulus of elasticity.

The epoxy resin A having an average of more than one epoxy group per molecule is preferably an epoxy liquid resin or a solid epoxy resin. The term "solid epoxy resin" is very well known to a person skilled in the art of epoxies and is used in contrast to "liquid epoxy resins". The glass transition temperature of solid resins is above room temperature, meaning that they can be comminuted at room temperature to give free-flowing powders.

Preferred epoxy resins have the formula (II)

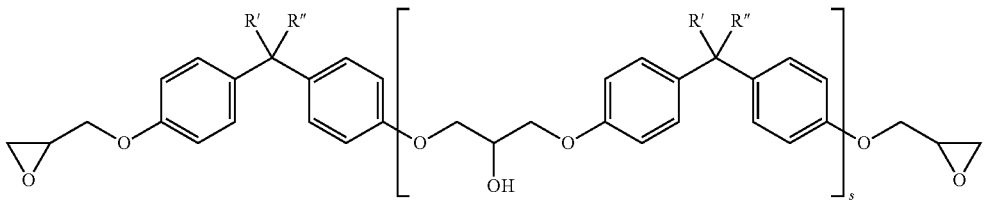

The substituents R' and R" here are, independently of each other, either H or CH$_3$.

In solid epoxy resins, the index s has a value of >1.5, especially of 2 to 12.

Such solid epoxy resins are commercially available, for example from Dow or Huntsman or Hexion.

Compounds of the formula (II) having an index s of 1 to 1.5 are referred to as semisolid epoxy resins by the person skilled in the art. For the present invention here, they are likewise considered to be solid resins. However, preferred solid epoxy resins are epoxy resins in the narrower sense, i.e. where the index s has a value of >1.5.

In liquid epoxy resins, the index s has a value of less than 1. Preferably, s has a value of less than 0.2.

Preference is thus given to diglycidyl ethers of bisphenol A (DGEBA), of bisphenol F, and of bisphenol A/F. Such liquid resins are available, for example, as Araldite® GY 250, Araldite® PY 304, Araldite® GY 282 (Huntsman) or D.E.R.™ 331 or D.E.R.™ 330 (Dow) or Epikote 828 (Hexion).

Further suitable epoxy resins A are what are called epoxy novolaks. These especially have the following formula:

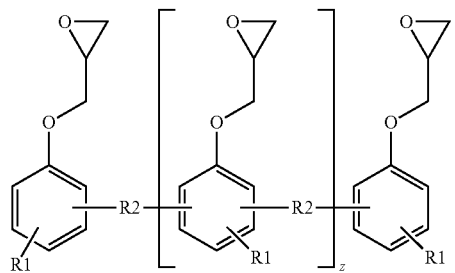

with R2=

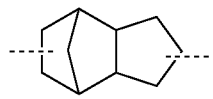

or CH$_2$, R1=H or methyl and z=0 to 7.

More particularly, these are phenol or cresol epoxy novolaks (R2=CH$_2$).

Such epoxy resins are commercially available under the EPN or ECN and Tactix® trade names from Huntsman or from the D.E.N.™ product series from Dow Chemical.

Preferably, the epoxy resin A is a liquid epoxy resin of the formula (II).

In a particularly preferred embodiment, the thermosetting epoxy resin composition contains both at least one liquid epoxy resin of the formula (II) with s<1, especially less than 0.2, and at least one solid epoxy resin of the formula (II) with s>1.5, especially from 2 to 12.

The proportion of the epoxy resin A is preferably 10-60% by weight, especially 30-50% by weight, based on the total weight of the epoxy resin composition.

It is further advantageous when 50-100% by weight, especially 80-100% by weight, of the epoxy resin A is an aforementioned liquid epoxy resin.

It is further advantageous when 0-30% by weight, especially 0-20% by weight, more preferably 5-15% by weight, of the epoxy resin A is an aforementioned solid epoxy resin.

The thermosetting one-component epoxy resin composition further comprises at least one curing agent B for epoxy resins which is activated by elevated temperature. Such latent curing agents are substantially inert at room temperature and are activated by elevated temperature, typically at temperatures of 70° C. or more, which starts the curing reaction. It is possible to use the standard latent curing agents for epoxy resins. The curing agent is preferably a latent nitrogen-containing curing agent for epoxy resins.

Examples of suitable latent curing agents are dicyandiamide, guanamines, guanidines, aminoguanidines and their derivatives; substituted ureas, especially 3-(3-chloro-4-methylphenyl)-1,1-dim ethylurea (chlorotoluron), or phenyldimethylureas, especially p-chlorophenyl-N,N-dimethylurea (monuron), 3-phenyl-1,1-dimethylurea (fenuron) or 3,4-dichlorophenyl-N, N-dimethylurea (diuron), and also imidazoles and amine complexes.

A particularly preferred latent curing agent is dicyandiamide.

The proportion of the curing agent B is preferably 0.5% to 12% by weight, more preferably 1% to 8% by weight, based on the total weight of the epoxy resin composition.

The thermosetting one-component epoxy resin composition further comprises at least one polyester polyol PP obtainable by the reaction of
at least one diol having the structure HO—(CH$_2$)$_{x'}$—OH where the value of x'=2 to 10, and
at least one dicarboxylic acid having the structure HOOC—(CH$_2$)$_{y'}$—COOH and derivatives of this dicarboxylic acid, where the value of y'=8 to 18.

Derivatives of these dicarboxylic acids are preferably carboxylic esters (especially the methyl and ethyl esters), acid halides (for example acid chlorides) and acid anhydrides.

The melting point is preferably determined with a DSC instrument (DIN 53 765). The sample and an empty reference crucible are heated at a heating rate of 20° C./min. The melting point corresponds to the maximum of the melting peak.

The polyester polyol PP preferably has a softening point of 50 to 110° C., especially 70 to 95° C. The softening point is determined in this document by the ring & ball method according to DIN ISO 4625.

Preferred polyester polyols PP also have a number-average molecular weight of 1500 to 9000, preferably 1500 to 6000, more preferably 2500-5000.

Preferred polyester polyols PP have a hydroxyl number (milliequivalents of KOH per gram of polyester polyol) of about 20 to 50, preferably about 25 to 40.

Moreover, preferred polyesterpolyols have a hydroxy functionality of about 2, especially of 1.9 to 2.1 (average number of hydroxyl groups per polymer chain).

Preferably, the diol usable in the preparation of the polyester polyols PP is selected from the list consisting of ethylene glycol, butane-1,4-diol, pentane-1,5-diol, hexane-1,6-diol, octane-1,8-diol and decane-1,10-diol. Mixtures thereof are also possible.

The most preferred are ethylene glycol, butane-1,4-diol and hexane-1,6-diol, especially ethylene glycol and hexane-1,6-diol, particularly hexane-1,6-diol.

Preferably, the dicarboxylic acid usable in the preparation of the polyester polyols PP is selected from the list consisting of decanedioic acid (sebacic acid), undecanedioic acid, dodecanedioic acid, tridecanedioic acid, tetradecanedioic acid, hexadecanedioic acid and octadecanedioic acid. Derivatives thereof and mixtures thereof are also possible. Preferably, the dicarboxylic acid is selected from the list consisting of decanedioic acid (sebacic acid), undecanedioic acid, dodecanedioic acid, tridecanedioic acid, tetradecanedioic acid, and is more preferably dodecanedioic acid.

Preferably, the polyester polyol PP is obtainable by the reaction of just one member from the list of diols described above and just one member of the list of dicarboxylic acids described above.

The proportion of the polyester polyol PP is 1.5% to 20% by weight, based on the total weight of the one-component thermosetting epoxy resin composition. The proportion of polyester polyol PP is preferably 2-15% by weight, 2.5-10% by weight, 3-10% by weight, especially 4-8% by weight, based on the total weight of the one-component thermosetting epoxy resin composition. Such a proportion leads to good spreading characteristics coupled with simultaneously high tensile shear strength values. A proportion of the polyester polyol PP of 2-4.5% by weight, 2.5-4% by weight, based on the total weight of the one-component thermosetting epoxy resin composition, is advantageous for high impact peel strength (I-peel) values, especially at −30° C.

The thermosetting epoxy resin composition optionally comprises at least one toughness improver D. The toughness improvers D may be liquid or solid.

More particularly, the toughness improver D is selected from the group consisting of terminally blocked polyurethane polymers D1, liquid rubbers D2 and core-shell polymers D3.

The toughness improver D is preferably a terminally blocked polyurethane polymer D1, preferably a terminally blocked polyurethane prepolymer of the formula (I)

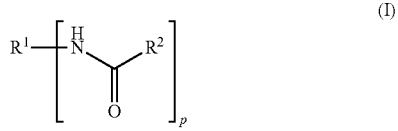

$R^1$ here is a p-valent radical of a linear or branched polyurethane prepolymer terminated by isocyanate groups after the removal of the terminal isocyanate groups, and p has a value of 2 to 8.

In addition, $R^2$ is independently a substituent selected from the group consisting of

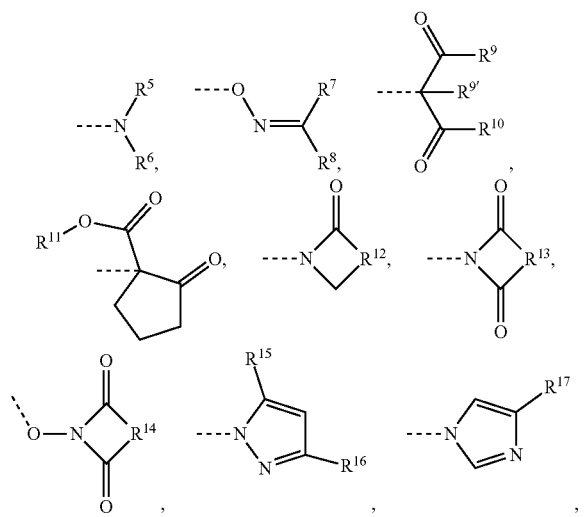

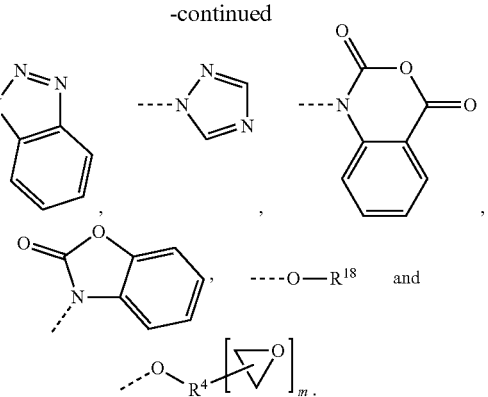

$R^5$, $R^6$, $R^7$ and $R^8$ here are each independently an alkyl or cycloalkyl or aralkyl or arylalkyl group, or $R^5$ together with $R^6$, or $R^7$ together with $R^8$, form part of a 4- to 7-membered, optionally substituted ring.

In addition, $R^{9'}$ and $R^{10}$ are each independently an alkyl or aralkyl or arylalkyl group or an alkyloxy or aryloxy or aralkyloxy group, and $R^{11}$ is an alkyl group.

$R^{12}$, $R^{13}$ and $R^{14}$ are each independently an alkylene group which has 2 to 5 carbon atoms and optionally has double bonds or is substituted, or a phenylene group or a hydrogenated phenylene group.

$R^{15}$, $R^{16}$ and $R^{17}$ are each independently H or an alkyl group or an aryl group or an aralkyl group, and $R^{18}$ is an aralkyl group or a mono- or polycyclic, substituted or unsubstituted aromatic group that optionally has aromatic hydroxyl groups.

Finally, $R^4$ is a radical of an aliphatic, cycloaliphatic, aromatic or araliphatic epoxide containing a primary or secondary hydroxyl group after the removal of the hydroxyl and epoxy groups, and m has a value of 1, 2 or 3.

$R^{18}$ is especially considered to be firstly phenols or polyphenols, especially bisphenols, after removal of a hydroxyl group. Preferred examples of such phenols and bisphenols are especially phenol, cresol, resorcinol, catechol, cardanol (3-pentadecenylphenol (from cashewnutshell oil)), nonylphenol, phenols that have been reacted with styrene or dicyclopentadiene, bisphenol A, bisphenol F and 2,2'-diallylbisphenol A. $R^{18}$ is secondly considered to be especially hydroxybenzyl alcohol and benzyl alcohol after removal of a hydroxyl group.

If $R^5$, $R^6$, $R^7$, $R^8$, $R^9$, $R^{9'}$, $R^{10}$, $R^{11}$, $R^{15}$, $R^{16}$ or $R^{17}$ is an alkyl group, it is especially a linear or branched $C_1$-$C_{20}$-alkyl group.

If $R^5$, $R^6$, $R^7$, $R^8$, $R^9$, $R^{9'}$, $R^{10}$, $R^{15}$, $R^{16}$, $R^{17}$ or $R^{18}$ is an aralkyl group, this moiety is especially a methylene-bonded aromatic group, especially a benzyl group.

If $R^5$, $R^6$, $R^7$, $R^8$, $R^9$, $R^{9'}$ or $R^{10}$ is an alkylaryl group, this is especially a phenylene-bonded $C_1$- to $C_{20}$-alkyl group, for example tolyl or xylyl.

The $R^2$ radicals are preferably the substituents of the formulae

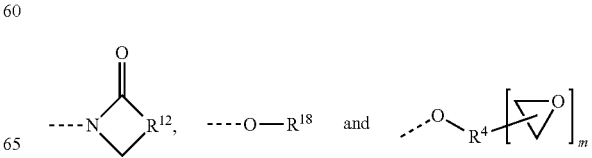

A preferred substituent of the formula

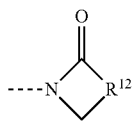

is ε-caprolactam after removal of the NH proton.

Preferred substituents of the formula —O—$R^{18}$ are monophenols or polyphenols, especially bisphenols, after removal of a phenolic hydrogen atom. Particularly preferred examples of such $R^2$ radicals are radicals selected from the group consisting of

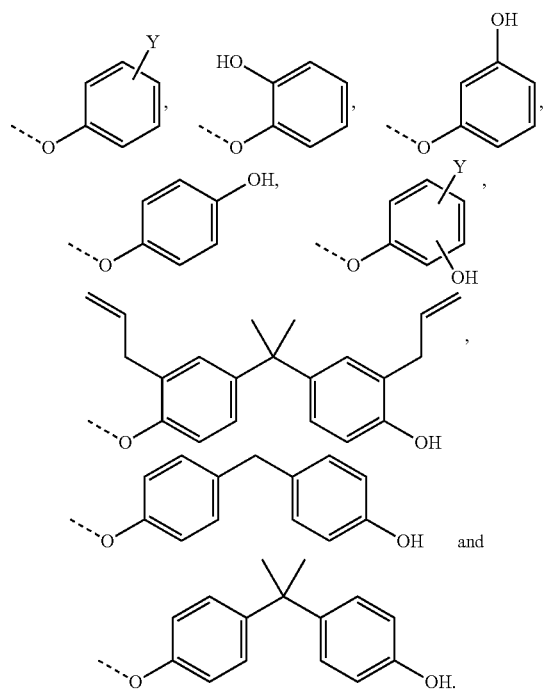

The Y radical here is a saturated, aromatic or olefinically unsaturated hydrocarbyl radical having 1 to 20 carbon atoms, especially having 1 to 15 carbon atoms. Preferred Y are especially allyl, methyl, nonyl, dodecyl, phenyl, alkyl ether, carboxylic ester or an unsaturated $C_{15}$-alkyl radical having 1 to 3 double bonds.

Most preferably, $R^2$ is —O—$R^{18}$.

The terminally blocked polyurethane prepolymer of the formula (I) is prepared from the linear or branched polyurethane prepolymer terminated by isocyanate groups with one or more isocyanate-reactive compounds $R^2H$. If two or more such isocyanate-reactive compounds are used, the reaction can be effected sequentially or with a mixture of these compounds.

The reaction is preferably effected in such a way that the one or more isocyanate-reactive compounds $R^2H$ are used stoichiometrically or in a stoichiometric excess in order to ensure that all NCO groups have been converted.

The polyurethane prepolymer with isocyanate end groups on which $R^1$ is based can be prepared from at least one diisocyanate or triisocyanate and from a polymer $Q_{PM}$ having terminal amino, thiol or hydroxyl groups and/or from an optionally substituted polyphenol $Q_{PP}$.

Suitable diisocyanates are aliphatic, cycloaliphatic, aromatic or araliphatic diisocyanates, especially commercial products such as methylene diphenyl diisocyanate (MDI), hexamethylene diisocyanate (HDI), toluene diisocyanate (TDI), toluidine diisocyanate (TODD, isophorone diisocyanate (IPDI), trimethylhexamethylene diisocyanate (TMDI), 2,5- or 2,6-bis(isocyanatomethyl)bicyclo[2.2.1]heptane, naphthalene 1,5-diisocyanate (NDI), dicyclohexylmethyl diisocyanate ($H_{12}MDI$), p-phenyl diisocyanate (PPDI), m-tetramethylxylylene diisocyanate (TMXDI), etc. and dimers thereof. Preference is given to HDI, IPDI, MDI or TDI.

Suitable triisocyanates are trimers or biurets of aliphatic, cycloaliphatic, aromatic or araliphatic diisocyanates, especially the isocyanurates and biurets of the diisocyanates described in the previous paragraph. It is of course also possible to use suitable mixtures of di- or triisocyanates.

Especially suitable polymers $Q_{PM}$ having terminal amino, thiol or hydroxyl groups are polymers $Q_{PM}$ having two or three terminal amino, thiol or hydroxyl groups.

The polymers $Q_{PM}$ advantageously have an equivalent weight of 300-6000, especially of 600-4000, preferably of 700-2200, g/equivalent of NCO-reactive groups.

Suitable polymers $Q_{PM}$ are polyols, for example the following commercially available polyols or any mixtures thereof:

polyoxyalkylene polyols, also called polyether polyols, which are the polymerization product of ethylene oxide, 1,2-propylene oxide, 1,2- or 2,3-butylene oxide, tetrahydrofuran or mixtures thereof, optionally polymerized with the aid of a starter molecule having two or three active hydrogen atoms, for example water or compounds having two or three OH groups. It is possible to use either polyoxyalkylene polyols having a low degree of unsaturation (measured to ASTM D-2849-69 and reported in milliequivalents of unsaturation per gram of polyol (meq/g)), prepared, for example, with the aid of what are called double metal cyanide complex catalysts (DMC catalysts for short), or polyoxyalkylene polyols having a higher degree of unsaturation, prepared, for example, with the aid of anionic catalysts such as NaOH, KOH or alkali metal alkoxides. Particularly suitable are polyoxypropylenediols and -triols having a degree of unsaturation of less than 0.02 meq/g and having an average molecular weight in the range of 1000-30 000 daltons, polyoxybutylenediols and -triols, polyoxypropylenediols and -triols having an average molecular weight of 400-8000 daltons, and what are called "EO-endcapped" (ethylene oxide-endcapped) polyoxypropylenediols or -triols. The latter are specific polyoxypropylene polyoxyethylene polyols that are obtained, for example, when pure polyoxypropylene polyols, on completion of the polypropoxylation reaction, are alkoxylated with ethylene oxide and hence have primary hydroxyl groups.

hydroxy-terminated polybutadiene polyols, for example those that are prepared by polymerization of 1,3-butadiene and allyl alcohol or by oxidation of polybutadiene, and hydrogenation products thereof;

styrene-acrylonitrile-grafted polyether polyols as supplied, for example, by BASF under the Lupranol® name;

polyhydroxy-terminated acrylonitrile/butadiene copolymers as preparable, for example, from carboxyl-terminated acrylonitrile/butadiene copolymers (commercially available under the Hypox® CTBN name from Emerald Performance Materials) and epoxides or amino alcohols;

polyester polyols prepared, for example, from di- to trivalent alcohols, for example ethane-1,2-diol, diethylene glycol, propane-1,2-diol, dipropylene glycol, butane-1,4-diol, pentane-1,5-diol, hexane-1,6-diol, neopentyl glycol, glycerol, 1,1,1-trimethylolpropane or mixtures of the aforementioned alcohols with organic dicarboxylic acids or the anhydrides or esters thereof, for example succinic acid, glutaric acid, adipic acid, suberic acid, sebacic acid, dodecanedicarboxylic acid, maleic acid, fumaric acid, phthalic acid, isophthalic acid, terephthalic acid and hexahydrophthalic acid or mixtures of the aforementioned acids, and polyester polyols formed from lactones, for example ε-caprolactone;

polycarbonate polyols as obtainable by reaction, for example, of the abovementioned alcohols—used to form the polyester polyols—with dialkyl carbonates, diaryl carbonates or phosgene.

Advantageously, the polymers $Q_{PM}$ are difunctional or higher-functionality polyols having OH equivalent weights of 300 to 6000 g/OH equivalent, especially of 600 to 4000 g/OH equivalent, preferably 700-2200 g/OH equivalent. Further advantageously, the polyols are selected from the group consisting of polyethylene glycols, polypropylene glycols, polyethylene glycol-polypropylene glycol block copolymers, polybutylene glycols, hydroxyl-terminated polybutadienes, hydroxyl-terminated butadiene/acrylonitrile copolymers, hydroxyl-terminated synthetic rubbers, hydrogenation products thereof and mixtures of these polyols mentioned.

In addition, polymers $Q_{PM}$ used may also be difunctional or higher-functionality amino-terminated polyethylene ethers, polypropylene ethers, as sold, for example, under the Jeffamine® name by Huntsman, polybutylene ethers, polybutadienes, butadiene/acrylonitrile copolymers, as sold, for example, under the Hypro® ATBN name by Emerald Performance Materials, and further amino-terminated synthetic rubbers or mixtures of the components mentioned.

For certain applications, suitable polymers $Q_{PM}$ are especially polybutadienes or polyisoprenes having hydroxyl groups or the partially or fully hydrogenated reaction products thereof.

It is additionally possible that the polymers $Q_{PM}$ may also have been chain-extended in the manner known to the person skilled in the art by the reaction of polyamines, polyols and polyisocyanates, especially diamines, diols and diisocyanates.

Using the example of a diisocyanate and a diol, what is formed therefrom, as shown hereinafter, according to the stoichiometry chosen, is a species of the formula (VI) or (VII)

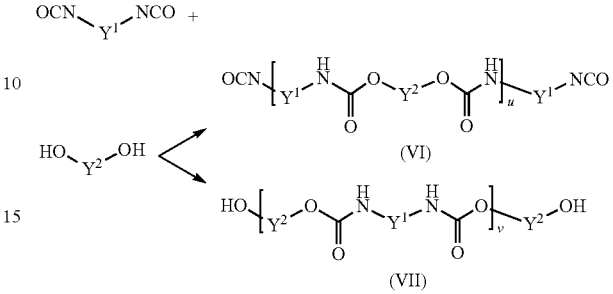

The $Y^1$ and $Y^2$ radicals are a divalent organic radical and the indices u and v vary according to the stoichiometric ratio from 1 to typically 5.

These species of the formula (VI) or (VII) may then in turn be reacted further. For example, the species of the formula (VI) and a diol having a divalent organic radical $Y^3$ can be used to form a chain-extended polyurethane prepolymer of the following formula:

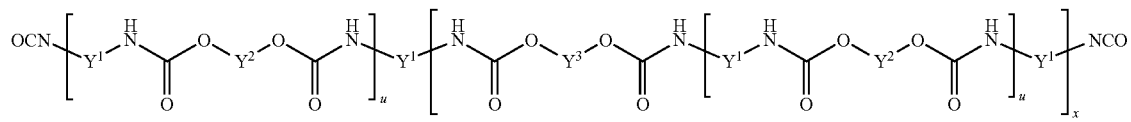

The species of the formula (VII) and a diisocyanate having a divalent organic radical $Y^4$ can be used to form a chain-extended polyurethane prepolymer of the following formula:

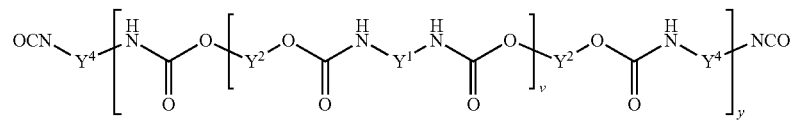

According to the stoichiometric ratio, the indices x and y vary from 1 to typically 5, and are especially 1 or 2.

In addition, it is also possible to react the species of the formula (VI) with the species of the formula (VII), so as to form a chain-extended polyurethane prepolymer having NCO groups.

For the chain extension, preference is given especially to diols and/or diamines and diisocyanates. It will of course be clear to the person skilled in the art that higher-functionality polyols, for example trimethylolpropane or pentaerythritol, or higher-functionality polyisocyanates, such as isocyanurates of diisocyanates, can also be used for the chain extension.

In the case of the polyurethane prepolymers in general and in the specific case of the chain-extended polyurethane prepolymers, it should advantageously be ensured that the prepolymers do not have excessively high viscosities, especially when higher-functionality compounds are being used for the chain extension, since this can make it difficult to convert them to the polyurethane prepolymers of the formula (I) or to apply the adhesive.

Preferred polymers $Q_{PM}$ are polyols having average molecular weights between 600 and 6000 daltons, selected from the group consisting of polyethylene glycols, polypropylene glycols, polyethylene glycol-polypropylene glycol block polymers, polybutylene glycols, hydroxyl-terminated polybutadienes, hydroxyl-terminated butadiene-acrylonitrile copolymers and mixtures thereof.

Especially preferred polymers $Q_{PM}$ are α,ω-dihydroxy polyalkylene glycols having $C_2$-$C_6$-alkylene groups or having mixed $C_2$-$C_6$-alkylene groups, terminated by amino, thiol or, preferably, hydroxyl groups. Particular preference is given to polypropylene glycols or polybutylene glycols. Particular preference is further given to hydroxyl group-terminated polyoxybutylenes.

Especially suitable polyphenols $Q_{PP}$ are bis-, tris- and tetraphenols. This is understood to mean not just straight phenols but optionally also substituted phenols. The nature of the substitution may be very varied. More particularly, this is understood to mean substitution directly on the aromatic ring to which the phenolic OH group is bonded. Phenols are additionally understood to mean not just monocyclic aromatics but also polycyclic or fused aromatics or heteroaromatics that have the phenolic OH group directly on the aromatic or heteroaromatic system.

The nature and position of such a substituent affects the reaction with isocyanates necessary for the formation of the polyurethane prepolymer among other properties.

The bis- and trisphenols are particularly suitable. Examples of suitable bisphenols or trisphenols include 1,4-dihydroxybenzene, 1,3-dihydroxybenzene, 1,2-dihydroxybenzene, 1,3-dihydroxytoluene, 3,5-dihydroxybenzoates, 2,2-bis(4-hydroxyphenyl)propane (=bisphenol A), bis(4-hydroxyphenyl)methane (=bisphenol F), bis(4-hydroxyphenyl) sulfone (=bisphenol S), naphthoresorcinol, dihydroxynaphthalene, dihydroxyanthraquinone, dihydroxybiphenyl, 3,3-bis(p-hydroxyphenyl)phthalide, 5,5-bis(4-hydroxyphenyl)hexahydro-4,7-methanoindane, phenolphthalein, fluorescein, 4,4'-[bis(hydroxyphenyl)-1,3-phenylenebis(1-methylethylidene)] (=bisphenol M), 4,4'-[bis(hydroxyphenyl)-1,4-phenylenebis(1-methylethylidene)] (=bisphenol P), 2,2'-diallylbisphenol-A, diphenols and dicresols prepared by reaction of phenols or cresols with diisopropylidenebenzene, phloroglucinol, gallic esters, phenol or cresol novolaks having —OH functionality of 2.0 to 3.5, and all isomers of the aforementioned compounds.

In a first embodiment, the polyurethane prepolymer is prepared from at least one diisocyanate or triisocyanate and from a polymer $Q_{PM}$ having terminal amino, thiol or hydroxyl groups. The polyurethane prepolymer is prepared in a manner known to the person skilled in the art of polyurethane, especially by using the diisocyanate or triisocyanate in a stoichiometric excess in relation to the amino, thiol or hydroxyl groups of the polymer $Q_{PM}$.

In a second embodiment, the polyurethane prepolymer is prepared from at least one diisocyanate or triisocyanate and from an optionally substituted polyphenol $Q_{PP}$. The polyurethane prepolymer is prepared in a manner known to the person skilled in the art of polyurethane, especially by using the diisocyanate or triisocyanate in a stoichiometric excess in relation to the phenolic groups of the polyphenol $Q_{PP}$.

In a third embodiment, the polyurethane prepolymer is prepared from at least one diisocyanate or triisocyanate and from a polymer $Q_{PM}$ having terminal amino, thiol or hydroxyl groups and from an optionally substituted polyphenol $Q_{PP}$. There are different options available for preparation of the polyurethane prepolymer from at least one diisocyanate or triisocyanate and from a polymer $Q_{PM}$ having terminal amino, thiol or hydroxyl groups and/or from an optionally substituted polyphenol $Q_{PP}$.

Particular preference is given to the first embodiment.

The polyurethane polymer having isocyanate end groups preferably has elastic character. It preferably exhibits a glass transition temperature Tg of less than 0° C.

Preferably, the proportions of the following are:
toughness improver D1 10-60% by weight, especially 20-40% by weight;
toughness improver D2 10-30% by weight, especially 20-30% by weight;
toughness improver D3 10-30% by weight, especially 20-30% by weight;
based on the total weight of the epoxy resin composition.

In a preferred embodiment, the one-component thermosetting epoxy resin composition additionally comprises at least one filler F. Preference is given here to mica, talc, kaolin, wollastonite, feldspar, syenite, chlorite, bentonite, montmorillonite, calcium carbonate (precipitated or ground), dolomite, quartz, silicas (fused or precipitated), cristobalite, calcium oxide, aluminum hydroxide, magnesium oxide, hollow ceramic beads, hollow glass beads, hollow organic beads, glass beads, color pigments. Particular preference is given to fillers selected from the group consisting of calcium carbonate, calcium oxide and fumed silicas.

Advantageously, the total proportion of the overall filler F is 5-40% by weight, preferably 5-20% by weight, based on the total weight of the epoxy resin composition.

The one-component thermosetting epoxy resin composition may further additionally comprise at least one epoxy group-bearing reactive diluent G. Such reactive diluents are known to those skilled in the art. Preferred examples of epoxy-bearing reactive diluents are:
  glycidyl ethers of monofunctional, saturated or unsaturated, branched or unbranched, cyclic or open-chain, $C_4$-$C_{30}$ alcohols, e.g. butanol glycidyl ether, hexanol glycidyl ether, 2-ethylhexanol glycidyl ether, allyl glycidyl ether, tetrahydrofurfuryl and furfuryl glycidyl ether, trimethoxysilyl glycidyl ether, and the like;
  glycidyl ethers of difunctional, saturated or unsaturated, branched or unbranched, cyclic or open-chain, $C_2$-$C_{30}$ alcohols, e.g. ethylene glycol glycidyl ether, butanediol glycidyl ether, hexanediol glycidyl ether, octanediol glycidyl ether, cyclohexanedimethanol diglycidyl ether, neopentyl glycol diglycidyl ether, and the like;
  glycidyl ethers of tri- or polyfunctional, saturated or unsaturated, branched or unbranched, cyclic or open-chain, alcohols, such as epoxidized castor oil, epoxidized trimethylolpropane, epoxidized pentaerythritol or polyglycidyl ethers of aliphatic polyols, such as sorbitol, glycerol, trimethylolpropane, and the like;
  glycidyl ethers of phenol compounds and aniline compounds, such as phenyl glycidyl ether, cresyl glycidyl ether, p-tert-butylphenyl glycidyl ether, nonylphenol glycidyl ether, 3-n-pentadecenyl glycidyl ether (from cashew nut shell oil), N,N-diglycidylaniline, and the like;
  epoxidized amines, such as N,N-diglycidylcyclohexylamine, and the like;
  epoxidized mono- or dicarboxylic acids, such as glycidyl neodecanoate, glycidyl methacrylate, glycidyl benzoate, diglycidyl phthalate, tetrahydrophthalate and hexahydrophthalate, diglycidyl esters of dimeric fatty acids, and the like;

epoxidized di- or trifunctional, low to high molecular weight polyether polyols, such as polyethylene glycol diglycidyl ether, polypropylene glycol diglycidyl ether, and the like.

Particular preference is given to hexanediol diglycidyl ether, cresyl glycidyl ether, p-tert-butylphenyl glycidyl ether, polypropylene glycol diglycidyl ether and polyethylene glycol diglycidyl ether.

Advantageously, the total proportion of the epoxy-bearing reactive diluent G is 0.1-15% by weight, preferably 0.1-5% by weight, especially preferably 0.1-2% by weight, more preferably 0.2-1% by weight, based on the total weight of the epoxy resin composition.

The one-component thermosetting epoxy resin composition may include further constituents, especially catalysts, stabilizers, especially heat and/or light stabilizers, thixotropic agents, plasticizers, solvents, mineral or organic fillers, blowing agents, dyes and pigments, anticorrosives, surfactants, defoamers and adhesion promoters.

A particularly preferred thermosetting one-component epoxy resin composition comprises:

10-60% by weight, especially 30-50% by weight, based on the total weight of the epoxy resin composition, of epoxy resin A having an average of more than one epoxy group per molecule; preferably 50-100% by weight, especially 80-100% by weight, of the epoxy resin A is a liquid epoxy resin and 0-30% by weight, especially 0-20% by weight, more preferably 5-15% by weight, of the epoxy resin A is a solid epoxy resin;

1-10% by weight, especially 2-6% by weight, based on the total weight of the epoxy resin composition, of at least one curing agent B for epoxy resins which is activated by elevated temperature;

1.5-20% by weight, 2-15% by weight, 2.5-10% by weight, 3-10% by weight, especially 4-8% by weight, based on the total weight of the epoxy resin composition, of at least one polyester polyol PP;

at least one toughness improver D selected from the group consisting of terminally blocked polyurethane polymers D1, liquid rubbers D2 and core-shell polymers D3, where the proportions are preferably as follows:

toughness improver D1 10-60% by weight, especially 20-40% by weight;

toughness improver D2 10-30% by weight, especially 20-30% by weight;

toughness improver D3 10-30% by weight, especially 20-30% by weight;

based on the total weight of the epoxy resin composition;

preferably 5-40% by weight, preferably 5-20% by weight, based on the total weight of the epoxy resin composition, of a filler F selected from the group consisting of calcium carbonate, calcium oxide and fumed silicas;

preferably 0.1-15% by weight, preferably 0.1-5% by weight, especially preferably 0.1-2% by weight, more preferably 0.2-1% by weight, based on the total weight of the epoxy resin composition, of an epoxy-bearing reactive diluent G;

It may further be advantageous when the preferred one-component thermosetting epoxy resin composition consists of the aforementioned constituents to an extent of more than 80% by weight, preferably more than 90% by weight, especially more than 95% by weight, especially preferably more than 98% by weight, most preferably more than 99% by weight, based on the total weight of the epoxy resin composition.

It may further be advantageous when the one-component thermosetting epoxy resin composition has a threshold value for the magnitude of the complex viscosity $\eta^*$ of more than 20'000 Pas, especially more than 40'000 Pas, preferably more than 60'000 Pas, more preferably more than 80'000 Pas, especially preferably more than 100'000 Pas.

Preferably, the one-component thermosetting epoxy resin composition attains more than 50%, especially more than 70%, especially more than 80%, of the rise in viscosity, based on the magnitude of the complex viscosity $\eta^*$ on commencement of the measurement at 150° C. (end of phase 1, start of phase 2), i.e. on commencement of cooling proceeding from 150° C. at a cooling rate of −23° C./min to the threshold for the magnitude of the complex viscosity $\eta^*$ of more than 20'000 Pas, especially more than 40'000 Pas, preferably more than 60'000 Pas, more preferably more than 80'000 Pas, especially preferably more than 100'000 Pas, within 20 seconds, preferably within 10 seconds.

It is further preferable when this is achieved prior to the attainment of cooling of the one-component thermosetting epoxy resin composition to 25° C. This is more preferably achieved 80-280 seconds after the start of the cooling of the one-component thermosetting epoxy resin composition from 150° C. at a cooling rate of −23° C./min.

Preferably, the one-component thermosetting epoxy resin composition reaches a maximum value for the magnitude of the complex viscosity $\eta^*$ of more than 100'000 Pas, especially more than 200'000 Pas, preferably more than 300'000 Pas, more preferably more than 500'000 Pas, preferably prior to the attainment of cooling of the one-component thermosetting epoxy resin composition to 25° C., preferably 80-280 seconds after the start of the cooling of the composition from 150° C. at a cooling rate of −23° C./min.

The aforementioned magnitude of the complex viscosity $\eta^*$ is determined by oscillography as described hereinafter in the examples by means of a rheometer with a heatable plate (MCR 302, Anton Paar) (200 μm gap, measurement plate diameter: 25 mm (plate/plate), deformation 0.01 at 5 Hz, within a temperature range of 150-25° C. (cooling rate −23° C./min)). The aforementioned method composed of three phases corresponds to the method described in the examples under "Measurement of viscosity characteristics".

Preferably, the one-component thermosetting epoxy resin composition in the cured state has at least one, preferably more than one and more preferably all the mechanical properties listed hereinafter. Impact peel strength (I-peel) and tensile shear strength (TSS) are measured as described below in the examples. Tensile strength and modulus of elasticity are determined to DIN EN ISO 527.

| | |
|---|---|
| Tensile strength [MPa] | >10, >20, especially >25 |
| Modulus of elasticity [MPa] | >500, >1000, especially >2000 |
| I-Peel (23° C.) [N/mm] | >20, especially >25 |
| I-Peel (−30° C.) [N/mm] | >10, especially >15 |
| ZSF [MPa] | >15, especially >20 |

Preferably, the one-component thermosetting epoxy resin composition has a viscosity at 23° C. of >5'000 Pas, >10'000 Pas, especially >15'000 Pas, determining the viscosity by oscillography by means of a rheometer with a heatable plate (Anton Paar MCR 302) (1000 μm gap, measurement plate diameter: 25 mm (plate/plate), deformation 0.01 at 5 Hz).

It is further preferable when the one-component thermosetting epoxy resin composition on introduction in step c) is at a temperature of 40-100° C., especially 50-100° C., especially preferably 50-80° C.

Moreover, the one-component thermosetting epoxy resin composition on introduction in step c) is at a temperature of not more than 20° C., not more than 15° C., preferably not more than 10° C., below the melting point of the polyester polyol PP. This is apparent, for example, from table 6. The melting point is preferably determined with a DSC instrument (DIN 53 765). The sample and an empty reference crucible are heated at a heating rate of 20° C./min. The melting point corresponds to the maximum of the melting peak.

It is also advantageous when the one-component thermosetting epoxy resin composition on introduction in step c) has a viscosity of <3'000 Pas, <2'000 Pas, especially <1'000 Pas, determining the viscosity by oscillography by means of a rheometer with a heatable plate (Anton Paar MCR 302) (1000 µm gap, measurement plate diameter: 25 mm (plate/plate), deformation 0.01 at 5 Hz).

It is also preferable when the method additionally comprises the step d) of curing the one-component thermosetting epoxy resin composition, especially at a temperature of at least 100° C., at least 120° C., at least 130° C., especially to a temperature of 140-220° C., especially of 140-200° C., more preferably between 160 and 190° C., for at least 10 min, at least 20 min, especially between 20 and 60 min.

The one-component thermosetting epoxy resin compositions are preferably introduced into the cavity (1) in step c) by means of a pump, by conveying the one-component thermosetting epoxy resin composition from a tank.

A further aspect of the present invention relates to the use of a one-component thermosetting epoxy resin composition as described above as a one-component thermosetting epoxy resin composition for introduction, especially injection, into a cavity (1) between two shaped bodies S1 and S2 arranged with respect to one another for bonding, especially adhesive bonding, of the two shaped bodies S1 and S2 to one another. Preferably, the one-component thermosetting epoxy resin composition is one as identified as preferred in the present description.

Yet another aspect of the present invention relates to the use of polyester polyols PP as described above as polyester polyols PP in one-component thermosetting epoxy resin compositions for reducing escape characteristics through lateral openings in cavities on introduction, especially injection, of the one-component thermosetting epoxy resin compositions into cavities having lateral openings. The cavities mentioned are especially above-described open cavities (1). Preferably, the polyester polyols PP, and the one-component thermosetting epoxy resin compositions, are those as identified as preferred in the present description.

The invention is further elucidated hereinafter by examples, but these are not intended to restrict the invention in any way.

LEGEND FOR FIGURES

| | |
|---|---|
| 1 | cavity |
| 2 | introduction opening |
| 3a | introduction channel |
| 3b | introduction channel |
| 4 | material recess |
| 5 | base element |
| 6 | transparent outer element |
| 7 | channel |
| 8 | spacer |
| 9 | introduction opening |
| 10 | fixing screws |
| 11 | epoxy resin composition introduced |
| 12 | boundary marker |
| 13 | spread markers |

EXAMPLES

There has been a search for epoxy resin compositions that, on injection into an open cavity, spread out predominantly in the cavity intended for the epoxy resin compositions and have sufficiently low spread into lateral openings that this need not be prevented by sealing elements. For this purpose, a test method was developed in order to examine such spreading characteristics in thermosetting one-component epoxy resin compositions.

Figure 2A:
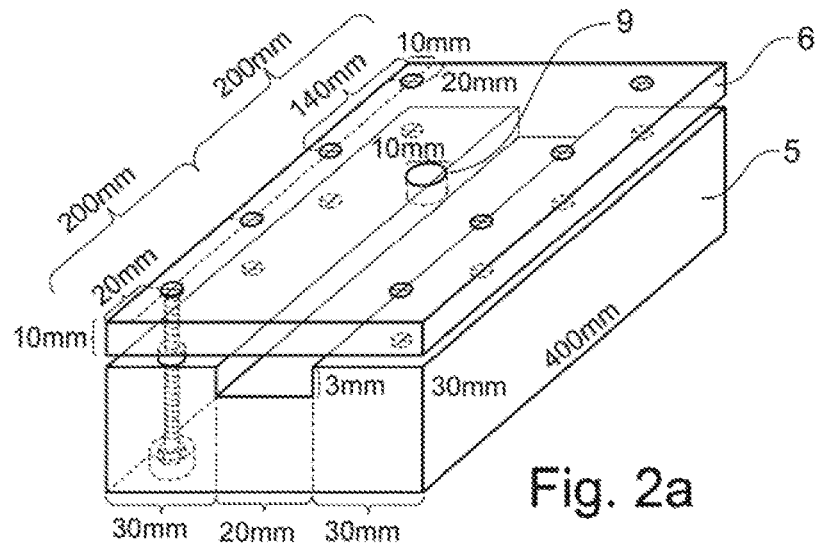
Figure 2B:
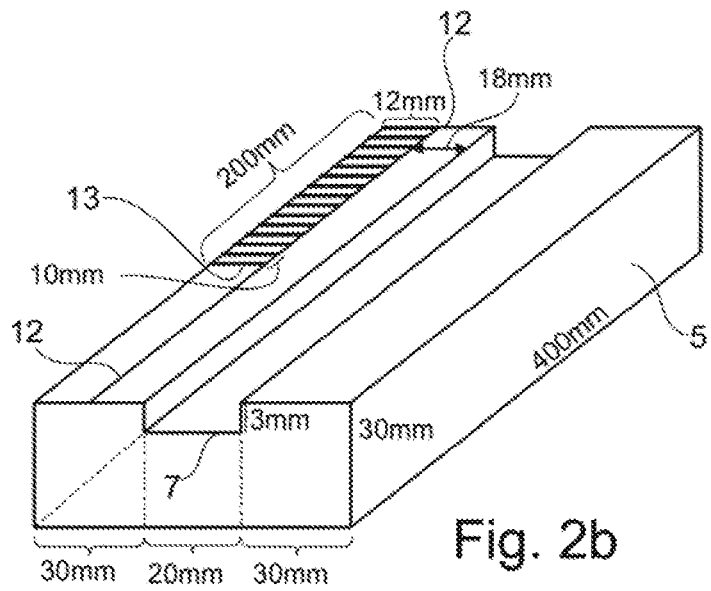

Test Method for Spreading Properties:

The test method uses a composite of two shaped bodies consisting of a base element 5 and a transparent outer element 6 as shown in FIG. 2a. The rectangular base element 5 consists of polyamide and has a length of 400 mm, a width of 80 mm and a height of 30 mm. The base element 5 has a recessed channel 7 running down the middle and having a rectangular cross section and a depth of 3 mm and a width of 20 mm. This is apparent, for example, in FIG. 2b.

On the base element 5, a boundary marker 12 that runs parallel to the channel 7 has been applied at a distance of 12 mm from the broad side (or 18 mm measured from channel 7). Spread markers 13 run at right angles to the boundary marker 12, each at a distance of 10 mm. The first boundary marker begins in the middle of the base element 5, and the rest of the boundary markers are arranged along the boundary marker up to the outer edge of the base element.

Figure 2C:
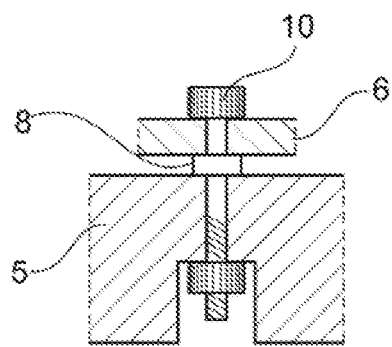

Spacers 8 are disposed between base element 5 and outer element 6, and these ensure a gap (with a uniform width) between base element and outer element. This is apparent, for example, in FIG. 2c. The height of the gap is adjustable by means of washers as spacers 8 and is 1 mm. Base element and outer element are held together by means of 8 fixing screws 10.

The transparent outer element 6 consists of polymethylmethacrylate (PMMA) and has a length of 400 mm, a width of 80 mm and a thickness of 10 mm. An introduction opening 9 having a diameter of 10 mm has been sunk into the middle of the cover element 6 (gap of 35 mm from each long side, and of 195 mm from each broad side). In the assembled state, the introduction opening 9 comes to rest exactly over the middle of the channel 7 of the base element 5.

The epoxy resin composition is introduced from the outside through the introduction opening 9 into the channel 7 at the injection rate, or injection pressure, and injection temperature displayed below.

Figure 3A:
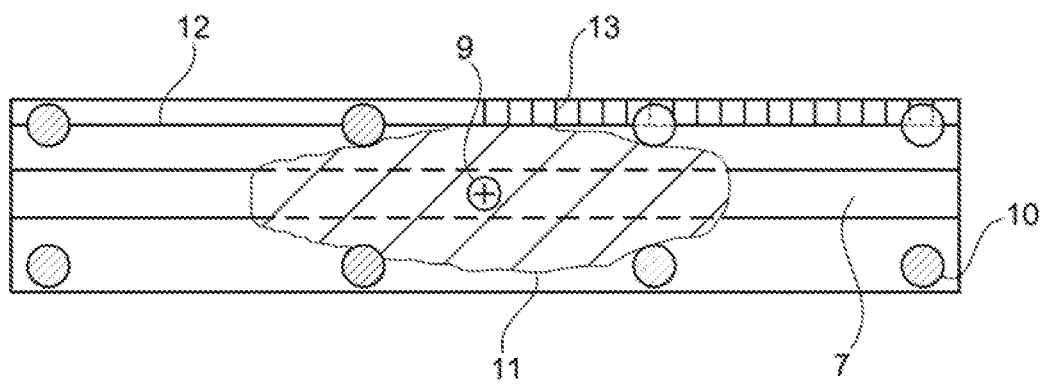
Figure 3B:
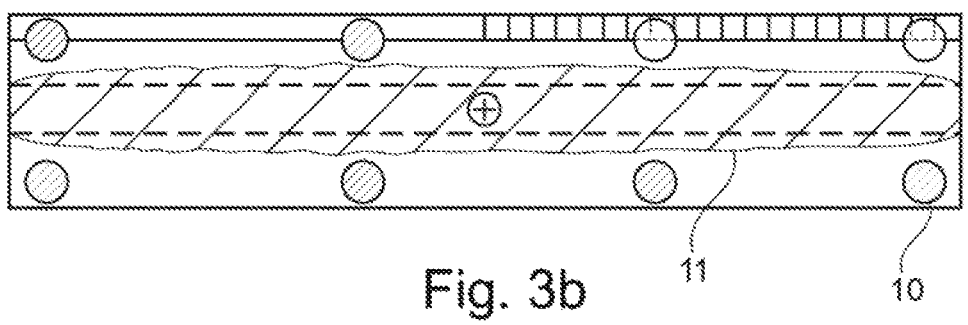

The figures FIG. 3a and FIG. 3b show a top view of the composite of base element 5 and transparent outer element 6 that has been assembled with 8 fixing screws 10. They show an introduced epoxy resin composition 11 which has spread along the channel 7. FIG. 3a shows a situation in which the introduced epoxy resin composition 11 has spread laterally up to the boundary marker 12. Once the epoxy resin composition reaches the boundary marker 12, the injection is stopped and the spread markers 13 are used to determine the spread in channel direction in the number of spread markers, with the spread markers in the middle of the base element serving as the starting point and not being counted. The spread markers attained +1 serves as the value of the "squeeze-out ratio".

In the example of FIG. 3a, the 10th boundary marker is attained, which corresponds to an extent of 100 mm, or a squeeze-out ratio of 11 (marker 10+1).

FIG. 3b shows a situation in which the already introduced epoxy resin composition 11 has spread predominantly along the channel 7. During the injection, the epoxy resin composition has not reached the boundary marker 12 before exit from the end of the channel. This corresponds to a spread of more than 200 mm, or a squeeze-out ratio of >20.

As described hereinafter, it has been found that, surprisingly, some of the epoxy resin compositions of the invention in the test method show behavior according to FIG. 3b. The heated epoxy resin compositions of the invention spread predominantly in the direction of the channel 7 and flow at least partly into the gap having a thickness of 1 mm between base element 5 and outer element 6. By virtue of the gap being smaller than the distance between a base of the channel 7 and the transparent outer element 6, the epoxy resin composition cools down more quickly in the gap than in the region of the channel 7 and solidifies as a result of this cooling in the region of the gap. This leads to a self-sealing function of the epoxy resin composition in the region of the gap.

An attempt was first made to influence the spreading properties of the epoxy resin composition by means of adjustment of the viscosity and/or of the thixotropic recovery time.

Epoxy resin compositions according to table 1 (tab. 1) were produced.

TABLE 1

| Raw materials | Parts by weight |
|---|---|
| Liquid epoxy resin, D.E.R. 331 (bisphenol A diglycidyl ether), Dow | 50 |
| Reactive diluent, hexanediol glycidyl ether, Denacol EX-212, Nagase America | 1 |
| Toughness improver D-1 | 35 |
| Curing agent, dicyandiamide (="Dicy") | 4.67 |
| Accelerator, substituted urea | 0.22 |
| Fumed silica | 5 |

Preparation of a Toughness Improver ("D-1")

150 g of poly-THF 2000 (OH number 57 mg/g KOH) and 150 g of PolyBD R$^{45}$V (OH number 46 mg/g KOH) were dried under reduced pressure at 105° C. for 30 minutes. Once the temperature had been reduced to 90° C., 61.5 g of IPDI and 0.14 g of dibutyltin dilaurate were added. The reaction was run under reduced pressure at 90° C. until the NCO content was constant at 3.10% after 2.0 h (calculated NCO content: 3.15%). Subsequently, 96.1 g of cardanol were added as blocking agent. Stirring was continued at 105° C. under vacuum until it was no longer possible to detect any free NCO. The product was used as such as toughness improver D-1. The following raw materials were used for the purpose:

Poly-THF 2000 (difunctional polybutylene glycol)
(OH equivalent weight = about 1000 g/OH equivalent), BASF
PolyBD R45V (hydroxyl-terminated polybutadiene)
(OH equivalent weight = about 1230 g/OH equivalent), Cray Valley
Isophorone diisocyanate (="IPDI"), Evonik
Cardolite NC-700 (cardanol, meta-substituted alkenylmonophenol), Cardolite The epoxy resin composition according to table 1 has a viscosity η from 0-5000 and a thixotropic recovery time to 50% of the starting structure of 5-15 seconds. The complex viscosity η* was determined using a rheometer (Physica MCR 302, Anton Paar) by means of rotational measurement (gap: 1 mm, plate/plate, plate diameter: 25 mm, shear rate: 0.1 s−1) at a temperature of 20° C.

Based on this composition, epoxy resin compositions with different viscosity η and/or different thixotropic recovery time were produced. By varying the proportions in % by weight of reactive diluent and the thixotropic agent (fumed silica) and in some cases by exchanging the fumed silica for organophilic sheet silicates, it was possible to obtain epoxy resin compositions with different viscosity η and/or different thixotropic recovery time.

TABLE 2

| Viscosity (Pa * s) | 15000-30000 | 10 | 10 | |
|---|---|---|---|---|
| | 5000-15000 | 10 | 10 | 10 |
| | 0-5000 | 10 | 11 | 11 |
| | | | (Tab. 1) | |
| | | 0-5 | 5-15 | 15-50 |
| | | Thirxotropic recovery time 50% (s) | | |

The spreading properties, i.e. the squeeze-out ratio, of the aforementioned epoxy resin compositions were determined at an injection temperature of 60° C. and an injection pressure of 2 bar.

It was found that, surprisingly, neither the viscosity η nor the thixotropic recovery time has a significant influence on the squeeze-out ratio. Moreover, the spreading properties of all epoxy resin compositions with a value of 10-11 are unsatisfactory.

Also examined was whether the proportions of the raw materials used in the epoxy resin compositions have an influence on the spreading properties. For this purpose, in the epoxy resin composition from table 1, the amount of liquid resin and of the toughness improver D-1 was varied.

TABLE 3

| Formulation | Variation | Squeeze-out-ratio 60° C., 2 bar | Squeeze-out-ratio 60° C., 1 bar |
|---|---|---|---|
| (Tab.1) | 50 parts by weight of D.E.R. 331, 35 parts by weight of D-1 | 11 | n.d. |
| INJ-1 | +20 parts by weight of D.E.R 331, −20 parts by weight of D-1 | 10 | 11 |
| INJ-2 | −20 parts by weight of D.E.R 331, +20 parts by weight of D-1 | 11 | 12 |

The spreading properties, i.e. the squeeze-out ratio, of the compositions were determined at an injection temperature of 60° C. and an injection pressure of 1 bar or 2 bar.

It was found that, surprisingly, the proportions of the raw materials used in the epoxy resin compositions do not have any significant influence on the squeeze-out ratio. Moreover, the spreading properties of all epoxy resin compositions with a value of 10-12 are unsatisfactory.

Also examined was whether the injection temperature or injection pressure, or the injection rate, have an influence on the spreading properties. For this purpose, epoxy resin compositions with different viscosities η (based on the epoxy resin composition from table 1) were used. The viscosity was determined by rotation by means of a rheometer (MCR 302, Anton Paar) (gap: 1000 μm, measurement plate diameter: 25 mm (plate/plate), shear rate: 0.1 s−1, temperature 20° C.).

TABLE 4

| Formulation | η (Pa*s) | Injection pressure | Injection temperature 23° C. | 60° C. |
|---|---|---|---|---|
| INJ-3 | 1750 | 2 bar | 8 | 11 |
|  |  | 6 bar | 8 | 11 |
| (Tab. 1) | 2020 | 2 bar | 8 | 11 |
|  |  | 6 bar | 8 | 10 |
| INJ-4 | 6930 | 2 bar | 8 | 10 |
|  |  | 6 bar | 8 | 11 |
| INJ-5 | 10300 | 2 bar | not pumpable | n.d. |
|  |  | 6 bar | 8 | 10 |
| INJ-6 | 27720 | 2 bar | not pumpable | n.d. |
|  |  | 6 bar | 8 | 10 |

"n.d." = not determined

It was found that, surprisingly, neither the injection temperature nor the injection pressure, or the injection rate, has a significant influence on the squeeze-out ratio. Moreover, the spreading properties of all epoxy resin compositions with a value of 8-11 are unsatisfactory.

Also examined was whether the use of additional raw materials in the epoxy resin compositions has an influence on spreading characteristics. Various raw materials of this kind were tested. These are detailed in table 5.

case of mixing with Dynacoll 7380, for example, "1:2" means 33.3% by weight of polyester polyol and 66.6% by weight of liquid epoxy resin.

This mixture was then cooled down to 25° C. In the case of the mixtures with the polyesters Licolub WE 40P, Licolub WE 4P and Licowax EP, it was found that no homogeneous mixture formed after cooling. These are unsuitable as additions for thermosetting epoxy resin compositions of the invention.

For the rest of the raw materials, the mixture was homogeneous after cooling. The viscosity characteristics of these compositions were then determined on cooling from 150° C. to 25° C.

Measurement of Viscosity Characteristics:

The method consists of three phases. During the first phase, the mixture is at a temperature of 150° C., meaning that the added raw material is in the liquid state. In the second phase, the temperature cools down to 25° C. at a constant cooling rate. In the third phase, the mixture is left at a temperature of 25° C. By this method, it is possible to determine the solidification characteristics of the mixture, the "sharpness" of the transition, and the time at which the solidification of the mixture occurs.

A rheometer was used (Physica MCR 302, Anton Paar) by means of oscillographic measurement (gap: 200 μm, plate/plate, plate diameter: 25 mm, frequency: 5 Hz, target deformation: 0.01) within a temperature range of 25-150° C. (cooling rate: −23° C./min, heating rate: +53° C./min) measured.

Phase 1: The mixture is brought to a temperature of 150° C. and left there for 265 seconds.

Phase 2: The mixture was brought to a temperature of 25° C. at a cooling rate of −23° C./min. In other words, the mixture was cooled uniformly and constantly from 150° C. to 25° C. within 325 seconds at a uniform and constant cooling rate of −23° C./min.

TABLE 5

| Mixture | Type | Structure | Product | Manufacturer | Ratio in liquid resin | M.p. | Mixing conditions | Miscibility | Viscosity rise (150° C. to 25° C.) |
|---|---|---|---|---|---|---|---|---|---|
| A | Polyester polyol | Terephthalic acid and hexanedioic acid with hexane-1,6-diol | Dynacoll 7340 | Evonik | 1:2 | 96° C. | 30' 140° C. | YES | slow |
| B | Polyester polyol | Hexanedioic acid with hexane-1,6-diol | Dynacoll 7360 | Evonik | 1:2 | 55° C. | 30' 100° C. | YES | slow |
| C | Polyester polyol | Dodecanedioic acid with hexane-1,6-diol | Dynacoll 7380 | Evonik | 1:2 | 70° C. | 30' 120° C. | YES | fast |
| D | Polyester polyol | Dodecanedioic acid with ethylene glycol | Dynacoll 7330 | Evonik | 1:2 | 85° C. | 30' 130° C. | YES | fast |
| E | Diamide wax | Diamide wax | Thixatrol MAX | Elementis | 1:4 | 100-120° C. | 30' 150° C. | YES | slow |
|  | Polyester | Esters of montanic acids | Licolub WE 40 P | Clariant | 1:4 | 73-79° C. | 30' 130° C. | NO* | n.d. |
|  | Polyester | Ester wax based on montanic acids | Licolub WE 4 P | Clariant | 1:4 | 79-81° C. | 30' 130° C. | NO* | n.d. |
|  | Polyester | Ester wax based on montanic acids | Licowax E P | Clariant | 1:4 | 79-83° C. | 30' 130° C. | NO* | n.d. |
| F | Polyester polyol |  | Fineplus HM 3123 | Dic | 1:2 | 85° C. | 30' 130° C. | YES | fast |

*= not homogeneous after cooling, n.d. = not determined

Measurement of Miscibility:

Mixtures of these raw materials with liquid epoxy resin were created in order to determine the mixing characteristics. This was done by mixing the raw materials at about 40° C. above the melting point for about 30 minutes with liquid epoxy resin (liquid epoxy resin, D.E.R. 331 (bisphenol A diglycidyl ether), Dow) in accordance with the ratio displayed in table 5 until a clear mixture was formed. In the Phase 3: Leaving the mixture at a temperature of 25° C.

Figure 4A:
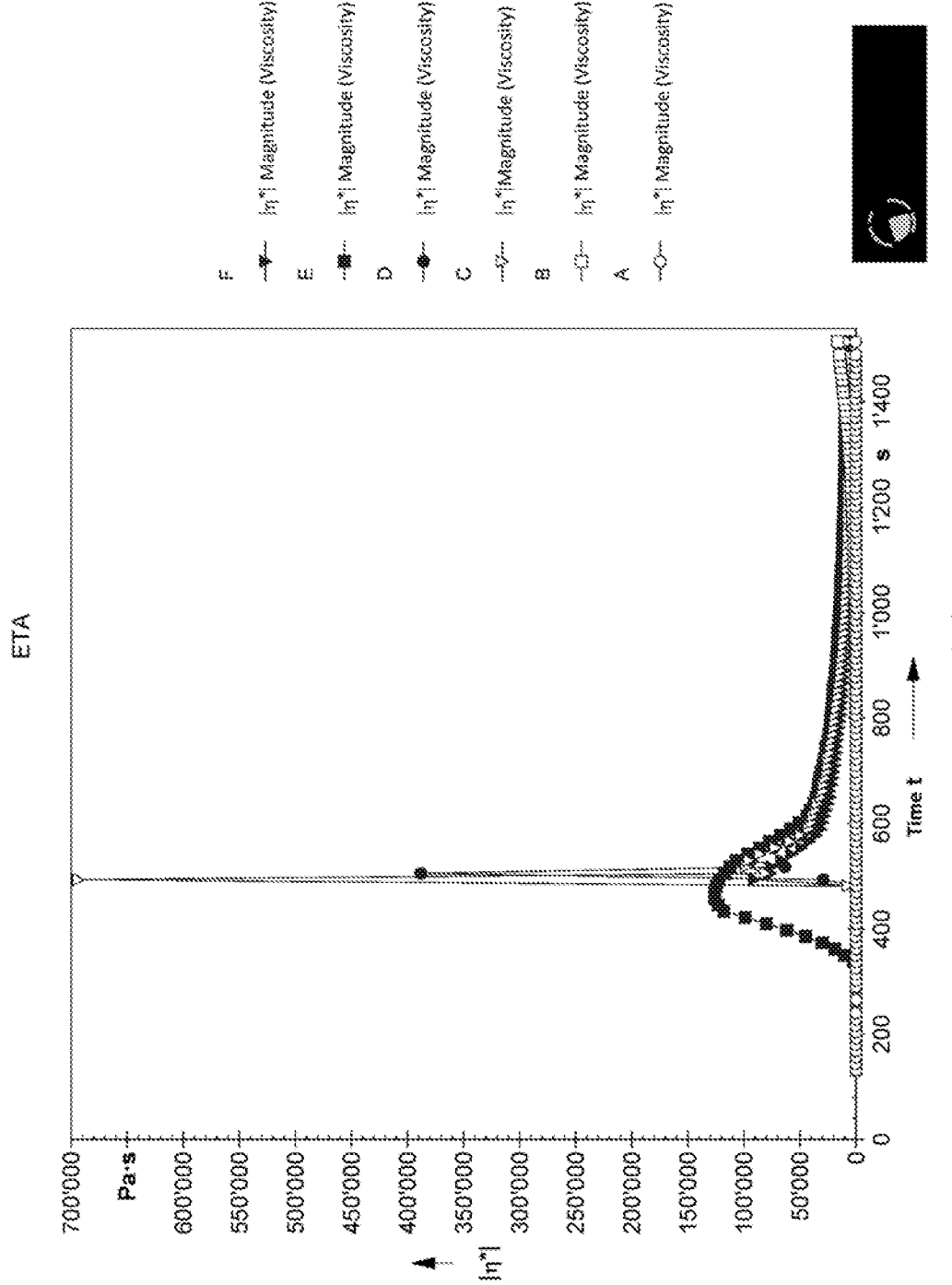
Figure 4B:
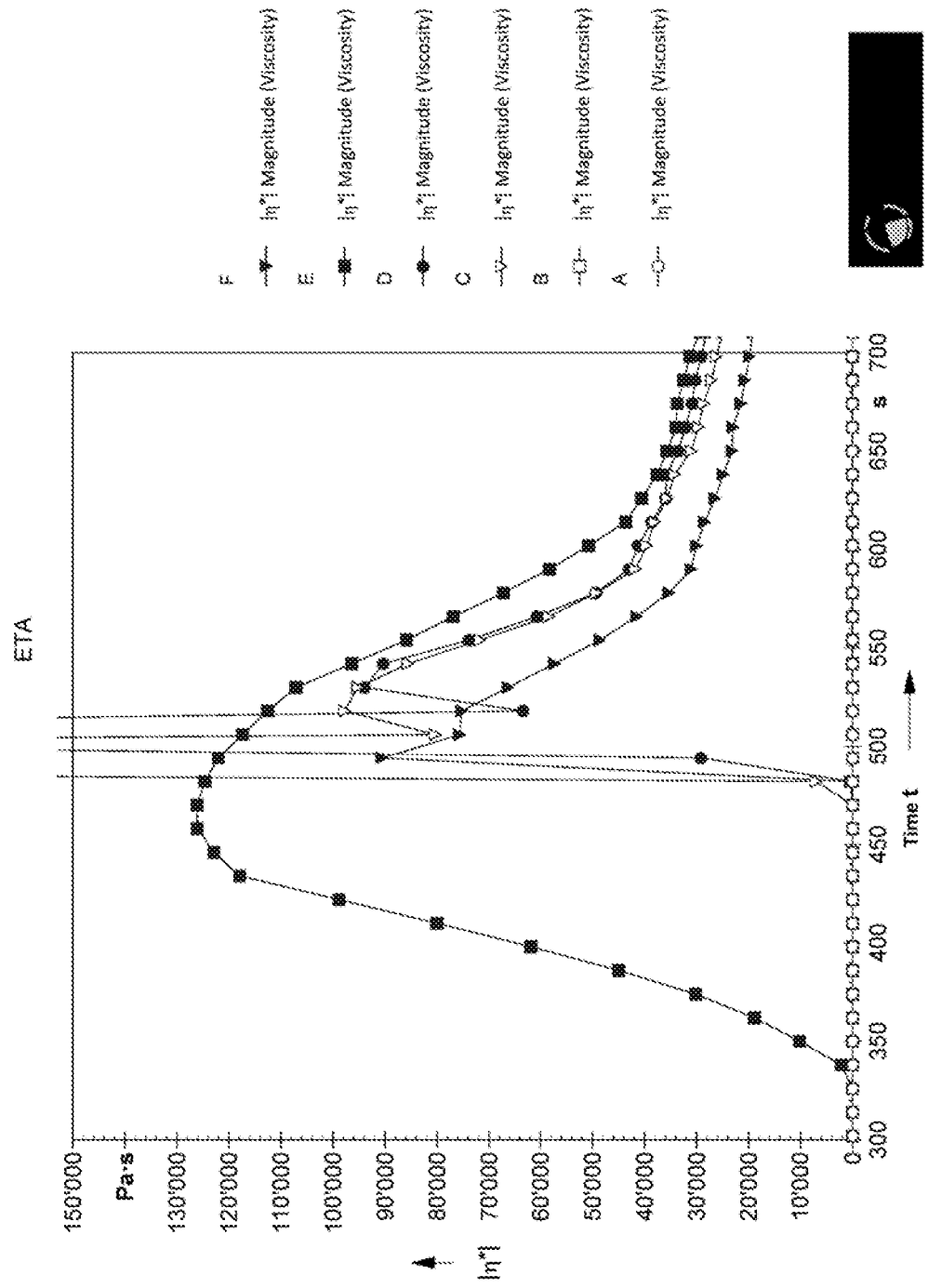
Figure 4C:
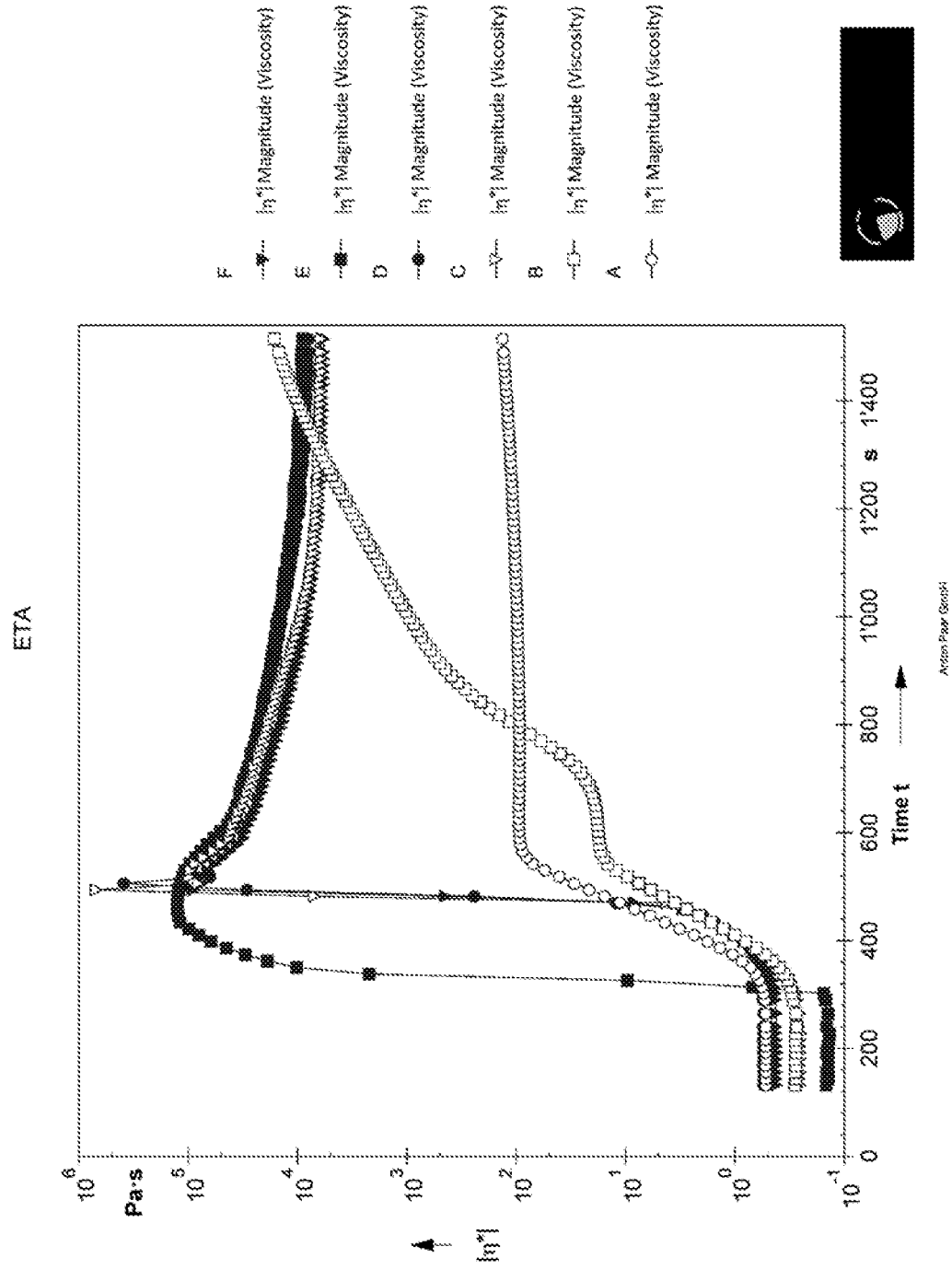
Figure 4D:
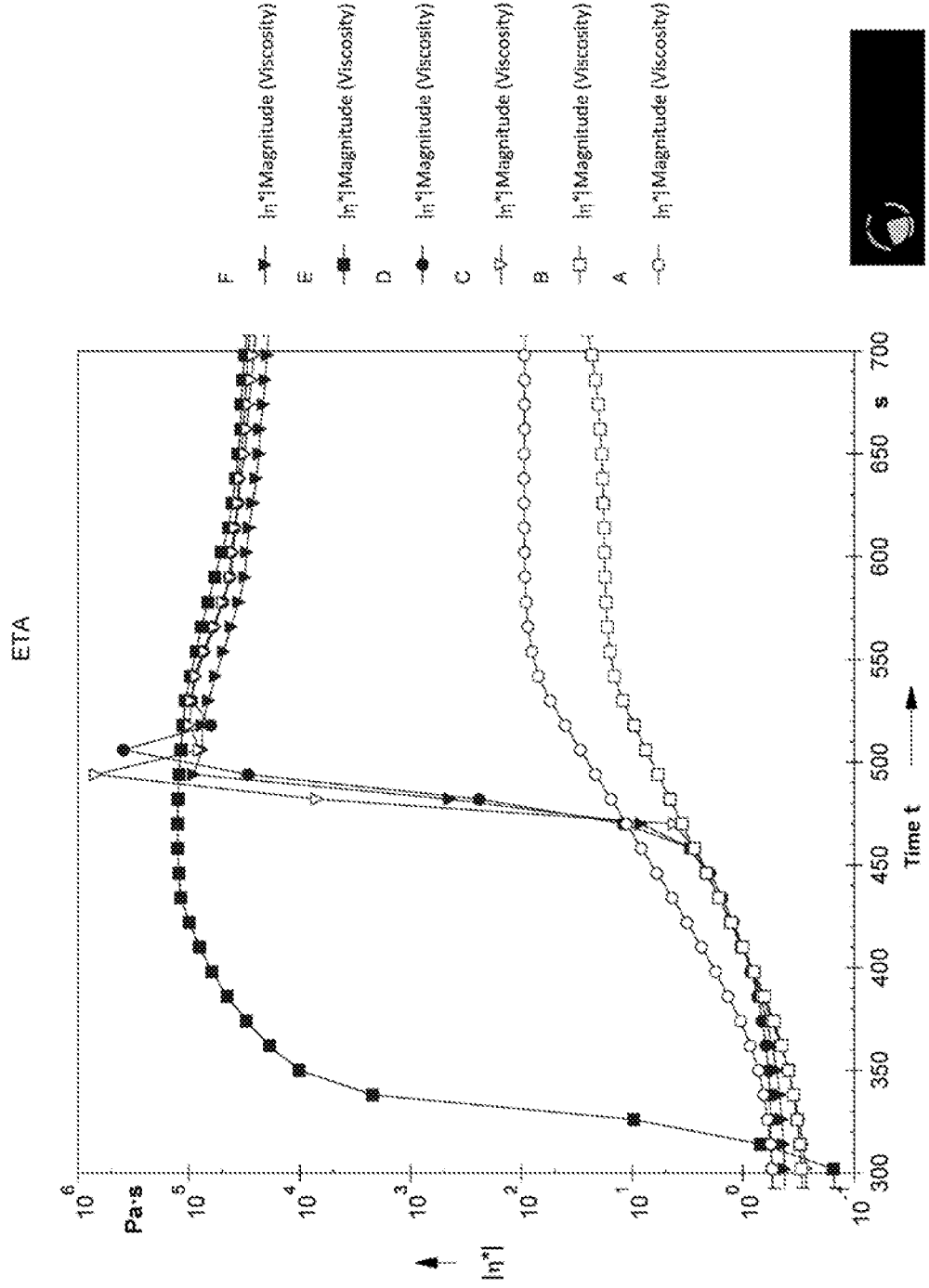

The magnitude of the complex viscosity η* was determined on the basis of the oscillographic measurement. FIGS. 4a-4d show the magnitude of the complex viscosity η*. The progression of the magnitude of the complex viscosity η* as a function of the time [t in seconds] for the mixtures A (○), B (□), C (Δ), D (●), E (■) and F (▼) is shown in FIGS. 4a-4d. FIGS. 4c and 4d show the magnitude of the complex viscosity η* shown in a logarithmic plot.

The above-described rheometer, and the above-described oscillographic measurement were used. The mixtures were brought to a temperature of 150° C. and the measurement was started. The commencement of the recording of the measurements is shown in FIGS. 4a-4d from 130 seconds after the start of measurement. 265 seconds after the start of measurement, the mixture was cooled down from a temperature of 150° C. at a cooling rate of −23° C./min to a temperature of 25° C. 590 seconds after commencement of measurement, the temperature of 25° C. was attained. The mixture was left at 25° C. until about 1500 seconds after commencement of measurement.

For mixtures C (Δ), D (●), E (■) and F (▼), a high and rapid rise in viscosity is apparent. They attain more than 80% of the rise in viscosity, proceeding from the magnitude of the complex viscosity η* on commencement of the measurement at 150° C. to the maximum value for the magnitude of the complex viscosity η*, within 20 seconds.

Moreover, they attain the maximum value for the magnitude of the complex viscosity η* within 80-280 seconds after commencement of the cooling of the mixtures from 150° C. at a cooling rate of −23° C./min, especially prior to the attainment of a temperature of 25° C.

Mixture E (■) shows a slow increase in viscosity, and mixtures A (○) and B (□) show a slow and slight increase in viscosity.

Based on mixture C, mixtures with different proportions by weight of Dynacoll 7380 based on the total weight of the mixtures of Dynacoll 7380 with liquid epoxy resin were produced (33% by weight, 7% by weight, 3% by weight, 2% by weight).

The mixture with 2% by weight of Dynacoll 7380 reached a maximum value for the magnitude of the complex viscosity η* of 39'000. Moreover, this mixture attained more than 80% of the rise in viscosity to 39'000, proceeding from the magnitude of the complex viscosity η* on commencement of the measurement at 150° C., within 50 seconds.

The other mixtures reached a maximum value for the magnitude of the complex viscosity η* of more than 100'000. Moreover, the mixtures with 33% by weight and 7% by weight attained more than 80% of the rise in viscosity to 100'000, proceeding from the magnitude of the complex viscosity η* on commencement of the measurement at 150° C., within 10 seconds.

Using raw materials C, D and F, the spreading characteristics of thermosetting one-component epoxy resin adhesives based on the epoxy resin composition from table 1 with different viscosity, different amount of the toughness improver D-1 and optionally additionally comprising a solid epoxy resin were produced. Composition Z-1 additionally contains 15 parts by weight of solid epoxy resin and 20 rather than 35 parts by weight of toughness improver D-1 and has a viscosity of 2500 Pas. Composition Z-2 contains 20 rather than 35 parts by weight of toughness improver D-1 and has a viscosity of 1000 Pas. Composition Z-3 additionally contains 10 parts by weight of solid epoxy resin and 15 rather than 35 parts by weight of toughness improver D-1 and has a viscosity of 3500 Pas. To compositions Z-1, Z-2 and Z-3 was added 5% by weight of Dynacoll 7380, Dynacoll 7330 or Fineplus HM 3123, based on the total weight of the corresponding composition.

Table 6 shows that compositions Z-1, Z-2 and Z-3 comprising raw material C (Dynacoll 7380) having a melting point of 70° C. show very good spreading characteristics at an injection temperature of 60° C. However, raw materials D (Dynacoll 7330) and F (Fineplus HM 3123), owing to their higher melting point of 85° C. in each case, show unsuitable spreading characteristics at an injection temperature of 60° C.

TABLE 6

| Raw material | Injection rate 47 ml/min, injection temperature 60° C., 5% by weight of raw material | | |
|---|---|---|---|
| | Z-1 | Z-2 | Z-3 |
| C | >20 | >20 | >20 |
| D | 9 | 9 | 9 |
| F | 9 | 9 | 9 |

When the same experiment was conducted with an injection temperature of 80° C. rather than 60° C., all epoxy resin adhesives showed good spreading characteristics. It is therefore advantageous when the one-component thermosetting epoxy resin composition comprising the raw material on injection has a temperature of not more than 20° C., not more than 15° C., preferably not more than 10° C., below the melting point of the raw material.

Different proportions by weight of Dynacoll 7380 were added to the epoxy resin composition according to table 7 and the propagation characteristics were determined. Moreover, tensile shear strength (TSS) and impact peel strength (I-peel) were determined.

TABLE 7

| Raw materials (parts by weight) | Z-4 | Z-5 | Z-6 | Z-7 | Z-8 | Z-9 |
|---|---|---|---|---|---|---|
| Liquid epoxy resin, D.E.R. 331 (bisphenol A diglycidyl ether), Dow | 50 | 50 | 50 | 50 | 50 | 50 |
| Reactive diluent, hexanediol glycidyl ether, Denacol EX-212, Nagase America | 1 | 1 | 1 | 1 | 1 | 1 |
| Toughness improver D-1 | 35 | 35 | 35 | 35 | 35 | 35 |
| Curing agent, dicyandiamide (="Dicy") | 4.6 | 4.6 | 4.6 | 4.6 | 4.6 | 4.6 |
| Accelerator, substituted urea | 0.2 | 0.2 | 0.2 | 0.2 | 0.2 | 0.2 |
| Fumed silica | 5 | 5 | 5 | 5 | 5 | 5 |
| Dynacoll 7380 | 0 | 2.5 | 5* | 10** | 20 | 30 |
| Dynacoll 7380 (% by weight) | 0 | 2.5 | 5.0 | 9.5 | 17.3 | 23.8 |
| Total (parts by weight) | 95.8 | 98.3 | 100.8 | 105.8 | 115.8 | 125.8 |
| Injection rate: 47 ml/min Injection temperature: 60° C. | 11 | 19 | >20 | >20 | >20 | >20 |

TABLE 7-continued

| Raw materials (parts by weight) | | | | Z-4 | Z-5 | Z-6 | Z-7 | Z-8 | Z-9 |
|---|---|---|---|---|---|---|---|---|---|
| Squeeze-out-ratio: | | | | | | | | | |
| TSS | 35' 175° C. | RT | MPa | 24.8 | 20.8 | 20.6 | 16.0 | 10.0 | 7.2 |
| I-Peel | 35' 175° C. | RT | N/mm | 33.3 | 35.0 | 33.7 | 24.1 | 5.7 | 3.8 |
| I-Peel | 35' 175° C. | −30° C. | N/mm | 34.9 | 37.5 | 33.9 | 23.1 | 0.2 | 0.2 |

*= maximum lateral spread in the gap <10 mm, **= maximum lateral spread in the gap <1 mm.

Table 7 shows that epoxy resin compositions containing an amount of more than 20% by weight of Dynacoll 7380 are no longer suitable as structural adhesives. It has been found that, surprisingly, epoxy resin compositions containing 2.5% by weight of Dynacoll 7380 have particularly high I-peel values, especially at −30° C.

Test Methods:
Tensile Shear Strength (TSS) (DIN EN 1465)

Cleaned test specimens of Elo H420 steel (thickness 1.2 mm) that had been reoiled with Anticorit PL 3802-39S were bonded with the adhesive over a bonding area of 25×10 mm with glass beads as spacer in a layer thickness of 0.3 mm, and cured at oven temperature 175° C. for 35 min. The tensile shear strength was determined on a tensile testing machine at a pull rate of 10 mm/min in a triple determination according to DIN EN 1465.

Impact Peel Strength (I-Peel) (to ISO 11343)

The specimens were produced with the adhesive and DC04+ZE steel with dimensions of 90×20×0.8 mm. The bonding area here was 20×30 mm at a layer thickness of 0.3 mm with glass beads as spacer. The samples were cured for 35 minutes at oven temperature 175° C. Impact peel strength was measured in each case at the temperatures specified (23° C., −30° C.) as a triple determination on a Zwick 450 impact pendulum. The impact peel strength reported is the average force in N/mm under the measurement curve from 25% to 90% to ISO011343.

The invention claimed is:

1. A method of bonding two shaped bodies S1 and S2, said method comprising the steps of:
   a) providing a shaped body S1,
   b) arranging a shaped body S2 with respect to the shaped body S1, forming a cavity between the two shaped bodies S1 and S2,
   c) introducing a one-component thermosetting epoxy resin compositions into the cavity,
wherein the one-component thermosetting epoxy resin composition is a one-component thermosetting epoxy resin composition comprising
   at least one epoxy resin A having an average of more than one epoxy group per molecule;
   at least one curing agent B for epoxy resins which is activated by elevated temperature; and
   at least one polyester polyol PP obtainable by the reaction of
      at least one diol having the structure HO—$(CH_2)_{x'}$—OH where the value of x'=2 to 10, and
      at least one dicarboxylic acid having the structure HOOC—$(CH_2)_{y'}$—COOH and derivatives of this dicarboxylic acid, where the value of y'=8 to 18, and
   wherein the proportion of the polyester polyol PP is 1.5% to 20% by weight, based on the total weight of the one-component thermosetting epoxy resin composition.

2. The method as claimed in claim 1, wherein the cavity is an open cavity.

3. The method as claimed in claim 1, wherein there is essentially no change in the distance in the cavity between the two shaped bodies after the step b) of arranging a shaped body S2 with respect to the shaped body S1.

4. The method as claimed in claim 1, wherein any change in distance between the two shaped bodies alongside the cavity after step b) is 0-100 mm.

5. The method as claimed in claim 1, wherein the one-component thermosetting epoxy resin composition is introduced through at least one introduction opening in at least one of the two shaped bodies.

6. The method as claimed in claim 1, wherein the cavity is a bonding site for a composite of the two shaped bodies.

7. The method as claimed in claim 1, wherein the cavity is a material recess in at least one of the two shaped bodies.

8. The method as claimed in claim 1, wherein the method additionally comprises step d) of curing the one-component thermosetting epoxy resin composition for at least 10 min.

9. The method as claimed in claim 1, wherein the one-component thermosetting epoxy resin composition on introduction in step c) is at a temperature of 40-100° C.

10. The method as claimed in claim 1, wherein the one-component thermosetting epoxy resin composition on introduction in step c) is at a temperature of not more than 20° C., below the melting point of the polyester polyol PP.

11. The method as claimed in claim 1, wherein the one-component thermosetting epoxy resin composition on introduction in step c) has a viscosity of <3,000 Pas, determining the viscosity by oscillography by means of a rheometer with a heatable plate (Anton Paar MCR 302) (1000 μm gap, measurement plate diameter: 25 mm (plate/plate), deformation 0.01 at 5 Hz).

12. The method as claimed in claim 1, wherein the one-component thermosetting epoxy resin composition has a viscosity at 23° C. of >5,000 Pas, determining the viscosity by oscillography by means of a rheometer with a heatable plate (Anton Paar MCR 302) (1000 μm gap, measurement plate diameter: 25 mm (plate/plate), deformation 0.01 at 5 Hz).

13. The method as claimed in claim 1, wherein the proportion of the polyester polyol PP is 2-15% by weight, based on the total weight of the one-component thermosetting epoxy resin composition.

14. The method as claimed in claim 1, wherein any change in distance between the two shaped bodies alongside the cavity after step b) is 0-30 mm.

15. A method comprising applying a one-component thermosetting epoxy resin composition into a cavity between two shaped bodies S1 and S2 arranged with respect to one another and bonding the two shaped bodies S1 and S2 to one another, wherein the one-component thermosetting epoxy resin composition comprises:
   at least one epoxy resin A having an average of more than one epoxy group per molecule;
   at least one curing agent B for epoxy resins which is activated by elevated temperature; and at least one polyester polyol PP obtainable by the reaction of
- at least one diol having the structure HO—$(CH_2)_{x'}$—OH where the value of x'=2 to 10, and
- at least one dicarboxylic acid having the structure HOOC—$(CH_2)_{y'}$—COOH and derivatives of this dicarboxylic acid, where the value of y'=8 to 18, and wherein the proportion of the polyester polyol PP is 1.5% to 20% by weight, based on the total weight of the one-component thermosetting epoxy resin composition.

16. A method comprising applying a polyester polyol PP in a one-component thermosetting epoxy resin compositions for reducing escape characteristics through lateral openings in cavities on introduction of the one-component thermosetting epoxy resin compositions into cavities having lateral openings, wherein the at least one polyester polyol PP is obtainable by the reaction of
- at least one diol having the structure HO—$(CH_2)_{x'}$—OH where the value of x'=2 to 10, and
- at least one dicarboxylic acid having the structure HOOC—$(CH_2)_{y'}$—COOH and derivatives of this dicarboxylic acid, where the value of y'=8 to 18, and wherein the proportion of the polyester polyol PP is 1.5% to 20% by weight, based on the total weight of the one-component thermosetting epoxy resin composition.

* * * * *